PULSE MODULATION CIRCUIT

Filed April 30, 1956 2 Sheets-Sheet 1

INVENTOR
R.O. SOFFEL
BY R. B. Ardis
ATTORNEY

INVENTOR
R. O. SOFFEL
BY R. B. Ardis
ATTORNEY

United States Patent Office 2,804,595

Patented Aug. 27, 1957

2,804,595

PULSE MODULATION CIRCUIT

Robert O. Soffel, Hastings-on-Hudson, N. Y., assignor to Bell Telephone Laboratories, Incorporated, New York, N. Y., a corporation of New York Application April 30, 1956, Serial No. 581,455

7 Claims. (Cl. 332—9)

Figure 1:
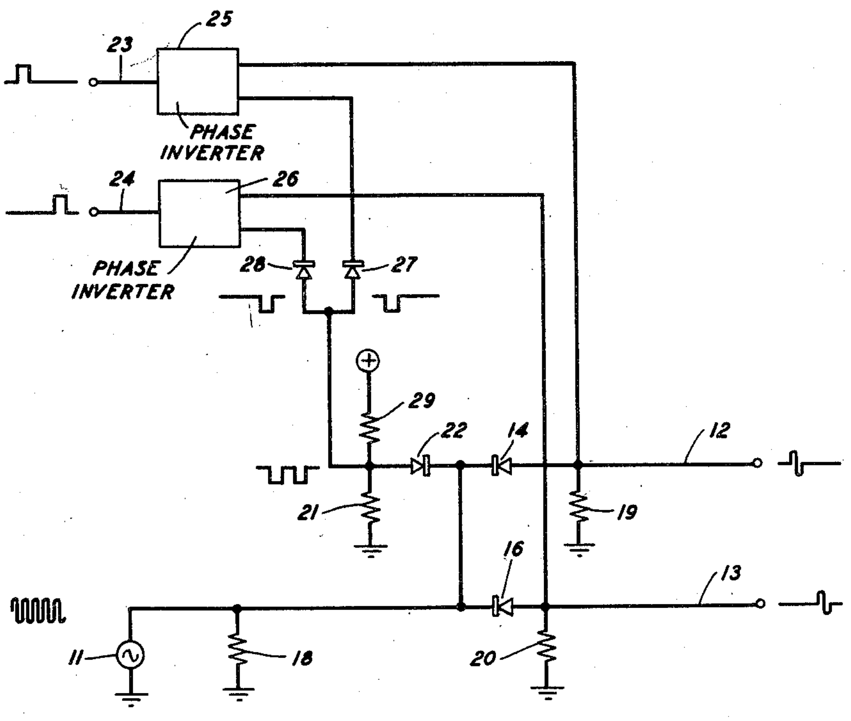

This invention relates generally to circuits for modulating a carrier wave under the control of D.-C. signal pulses and more particularly, although in its broader aspects not exclusively, to circuits which make use of a plurality of diodes to transmit carrier during the application of D.-C. signal pulses to one or more signal input channels.

A principal object of the invention is to prevent spurious transmission of carrier in a pulse modulation system during the absence of a signal pulse.

Another object is to preserve substantially the same terminating impedance for the carrier source in a pulse modulation system during both the presence and the absence of a signal pulse.

In the past, when it has been necessary to transmit a carrier wave into one or more output channels under the control of signal pulses applied separately to control each channel, it has been customary to connect diodes between the carrier source and each output channel as switches and to bias the diodes in each channel in the forward direction during the presence of a signal pulse at the input to that channel in order to switch the diodes from their high impedance condition to their low impedance condition. While such diode switching arrangements operated in their intended manner during those intervals in which carrier was being transmitted to any of the output chanels, there was sometimes a tendency for spurious transmission to one or more of the output channels to occur during the absence of a signal pulse. Furthermore, there were relatively large changes in the impedance presented by the diode switching circuits to the carrier source as the diodes were switched from their non-conducting condition to their conducting condition and back again.

From one of its most important aspects, the invention takes the form of a pulse modulation circuit which supplies carrier through a diode switching circuit to any one of a group of one or more modulator output circuits in response to the application of a D.-C. signal pulse to the control path for that modulator output circuit, blocks spurious transmission to any non-activated modulator output circuit while any other modulator output circuit is being activated by an applied signal pulse, blocks spurious transmission to all modulator output circuits in the absence of any signal pulse, and preserves substantially the same terminating impedance for the carrier source at all times, regardles of the presence or absence of a signal pulse. In particular, the invention features a dummy output circuit, having substantially the same impedance as each of the modulator output circuits, connected to the carrier source through a diode switching circuit like those coupling the various modulator output circuits to the carrier source. In accordance with an important feature of the invention, the dummy output diode switching circuit is biased to its low impedance condition whenever no signal pulse is present at any of the activating leads for the modulator output circuits, providing not only a terminaitng impedance for the carrier source but also an affirmative reverse diode bias to block spurious transmission to any of the various modulator output circuits.

In accordance with another important feature of the invention, means is provided in each modulator output circuit control path to generate a pair of simultaneous D.-C. pulses of opposite sense in response to each incoming signal pulse, to supply one pulse to the appropriate diode switching circuit to provide a low impedance path from the carrier source to the activated modulator output circuit, and to supply the oppositely directed pulse to the dummy output diode switching circuit to block transmission. In the absence of a signal pulse, the same control couplings serve to connect the dummy output circuit to the carrier source and to block spurious carrier transmission to the modulator output circuits.

Figure 2:
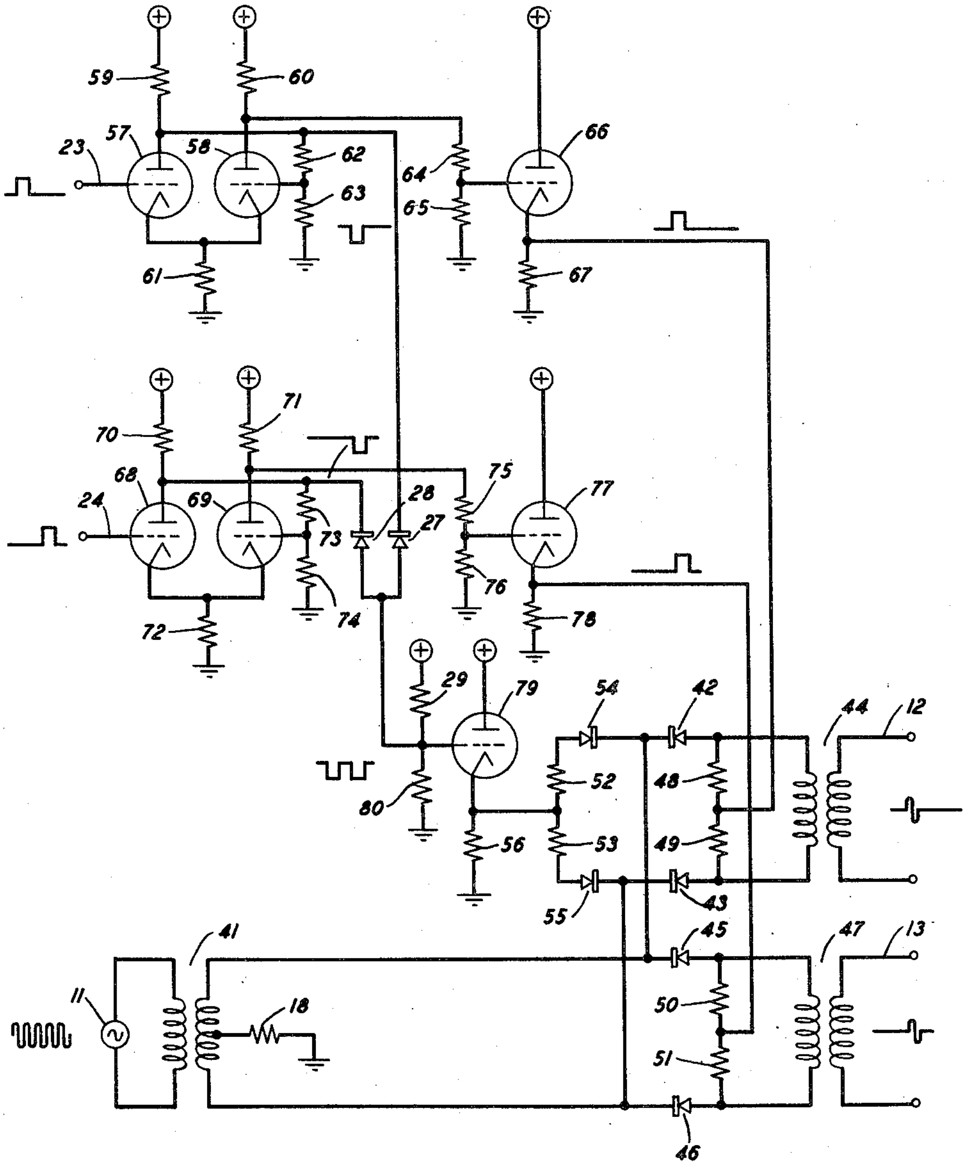

A more complete understanding of the invention may be obtained from a study of the following detailed description of a pair of specific embodiments. In the drawings:

Fig. 1 illustrates a simplified single-sided embodiment of the invention which is particularly useful in arriving at an understanding of the nature and operation of the invention; and Fig. 2 shows a more complete balanced-to-ground embodiment of the invention in schematic diagram form.

The pulse modulation system illustrated in Fig. 1 includes a carrier source 11 and a pair of modulator output circuits 12 and 13. One side of carrier source 11 is grounded and the other is connected through a diode 14 to modulator output circuit 12 and through a diode 16 to modulator output circuit 13. Diodes 14 and 16 are both poled for easy current flow toward carrier source 11. A resistor 18 is connected in parallel with carrier source 11, a resistor 19 is returned to ground from the anode of diode 14, and a resistor 20 is returned to ground from the anode of diode 16. In this connection, it should be noted that diodes 14 and 16, as well as the other diodes shown in Figs. 1 and 2, may be of the semiconductor variety. The terms "anode" and "cathode" are used to indicate the respective diode terminals from which and toward which current flows in the direction of easy flow and are intended to be as applicable to semiconductor diodes as to diodes of any other type.

The portion of the Fig. 1 pulse modulation system which has already been described is operative to pass carrier to either one of modulator output circuits 12 and 13 upon application of a positive-going D.-C. signal pulse to the anode of the respective one of diodes 14 and 16. A positive pulse at the anode of diode 14 biases that diode in the forward direction, causing it to assume a low impedance condition. The positive pulse then appears at the cathode of diode 16, biasing it in the reverse direction and causing it to assume a high impedance condition. Under such conditions, carrier passes through diode 14 to modulator output circuit 12 for as long as the pulse persists. The reverse bias on diode 16 blocks carrier from modulator output circuit 13. The terminating impedance presented to carrier source 11 is substantially that provided by resistor 19, representing the impedance of modulator output circuit 12. In the absence of a signal pulse at the anode of either diode 14 or 16, however, there would be no bias on either diode 14 or 16. There could be a tendency for carrier to leak through both diodes to modulator output circuits 12 and 13 and the impedance presented to carrier source 11 would very likely differ widely from the resistances of resistors 19 and 20.

The present invention overcomes these disadvantages of the prior art and provides not only an affirmative reverse bias on both diodes 14 and 16 in the absence of a signal pulse but also permits substantially the same terminating impedance to be presented to carrier source 11 at all times. In accordance with one principal feature of the invention, the pulse modulation circuit in Fig. 1 is provided with a dummy output circuit represented by a resistor 21, one side of which is grounded. The ungrounded side of resistor 21 is connected through a diode 22 to the ungrounded side of carrier source 11. Like diodes 14 and 16, diode 22 is poled for easy current flow toward carrier source 11. The resistance of dummy output circuit resistor 21 is substantially the same as that of modulator output circuit terminating resistors 19 and 20.

In accordance with another important feature of the invention, means is provided to generate a pair of simultaneous pulses of opposite sense in response to each D.-C. signal pulse. In the embodiment of the invention shown in Fig. 1, each modulating signal pulse is received on one of two incoming lines 23 and 24. As shown, signal pulses received on line 23 activate modulator output circuit 12, while those received on line 24 activate modulator output circuit 13. On each line, however, a received pulse is supplied to a respective one of two phase inverters 25 and 26, the outputs of which appear at two terminals. At one terminal of each phase inverter, the output is in the form of a positive-going pulse from a first positive reference potential to a second higher positive reference potential. At the other terminal of each amplifier, the output is in the form of a pulse of the opposite sense from the second or higher reference potential to the first or lower reference potential. In accordance with the present invention, the positive-going output lead of phase inverter 25 is connected to the anode of diode 14, the positive-going output lead of phase inverter 26 is connected to the anode of diode 16, and the remaining output leads of both differential amplifiers are connected through respective diodes 26 and 27 to the anode of dummy output circuit diode 22. Diodes 27 and 28 are both poled for easy current flow toward their respective phase inverters and the anode of diode 22 is connected to a positive potential of the same order of magnitude as the above-mentioned high reference potential through a resistor 29.

The operation of the embodiment of the invention shown in Fig. 1 is illustrated by the waveforms appearing alongside certain of the leads and connections in the figure. In the illustrated example, a D.-C. signal pulse appears at the input side of phase inverter 25 during the first pulsing interval. The positive-going output pulse from phase inverter 25 is applied to the anode of diode 14 and biases that diode in the forward direction. Diode 14 becomes a low impedance and applies a positive potential to the cathodes of diodes 16 and 22, biasing those diodes in the reverse direction and causing them to present a high impedance. Carrier is thereby transmitted through diode 14 to modulator output circuit 12 for as long as the first signal pulse persists. While all this is going on, the other output from phase inverter 25 is at the lower of its two potential levels, biasing diode 27 in the forward direction and removing any previously existing forward bias from diode 22.

When the first signal pulse on lead 23 disappears, there is no input to either phase inverter 25 or 26 until the next pulsing interval. The positive-going outputs of both phase inverters remain at the lower of their two output states in the meantime and the other outputs remain at the higher of their two output states. As a result, the forward bias is removed from diode 14 and there is still no forward bias on diode 16. Both of the other outputs from phase inverters 25 and 26 remain highly positive, however, biasing both diodes 27 and 28 in the reverse direction. Since diodes 27 and 28 both are in their high impedance state, there is no influence at the anode of diode 22 to offset the positive potential supplied through resistor 29 and diode 22 is biased in the forward direction. A positive potential is thereby supplied to the cathodes of diodes 14 and 16, providing a heavy reverse bias to prevent spurious transmission of carrier to modulator output circuits 12 and 13. At the same time, the low impedance of forward-biased diode 22 connects dummy output resistor 21 across carrier source 11, retaining substantially the same terminating impedance as that presented by either of modulator output circuits 12 and 13.

When a signal pulse appears on input lead 24 in the embodiment of the invention illustrated in Fig. 1, the operation is much as described in connection with the appearance of a signal pulse on lead 23. The positive-going output of phase inverter 26 biases diode 16 in the forward direction. Diode 16 transmits a positive potential to the cathodes of diodes 14 and 22, biasing both in the reverse direction and blocking carrier from both modulator output circuit 12 and dummy output circuit 21. The other output of phase inverter 26 goes to the lower of its two values, causing diode 28 to receive a forward bias through resistor 29 and the effect of the positive potential applied through resistor 29 to the anode of diode 22 to be canceled.

A balanced counterpart of the generalized single-sided embodiment of the invention which has been described is illustrated in detail in Fig. 2. Carrier source 11 is connected across the primary winding of an input transformer 41. The intermediate point on secondary winding of transformer 41 is returned to ground through a resistor 18. The opposite ends of the secondary winding of transformer 41 are connected through respective ones of a pair of diodes 42 and 43 to the opposite ends of the primary winding of an output transformer 44. The secondary winding of transformer 44 is connected directly to modulator output circuit 12. The circuit path interconnecting carrier source 11 with modulator output circuit 13 is substantially the same. The opposite ends of the secondary winding of input transformer 41 are connected through respective ones of a pair of diodes 45 and 46 to the opposite ends of the primary winding of an output transformer 47. The secondary winding of transformer 47 is connected to modulator output circuit 13. Diodes 42, 43, 45, and 46 are all poled for easy current flow toward carrier source 11.

Modulating D.-C. signal pulses are applied to the control path for modulator output circuit 12 through a pair of resistors 48 and 49 and to the control path for modulator output circuit 13 through a pair of resistors 50 and 51. Resistors 48 and 49 are connected in series between the anodes of diodes 42 and 43, while resistors 50 and 51 are connected in series between the anodes of diodes 45 and 46.

In Fig. 2, the dummy output circuit featured by the invention takes the form of a pair of series resistors 52 and 53. The ends of resistors 52 and 53 remote from their common point are connected through respective ones of a pair of diodes 54 and 55 to corresponding ends of secondary winding of carrier input transformer 41. Diodes 54 and 55 are also poled for easy current flow toward carrier source 11. The common point between dummy output circuit resistors is connected to ground through a resistor 56 which, as will be explained later, is the load resistor of a cathode follower.

In the embodiment of the invention shown in schematic diagram form in Fig. 2, D.-C. signal pulses on incoming line 23 are supplied to a slicer corresponding to phase inverter 25 of Fig. 1 and made up of a pair of triode vacuum tubes 57 and 58. The anodes of tubes 57 and 58 are connected to a positive anode supply source through anode resistors 59 and 60, respectively, and their cathodes are connected together and returned to ground through a common cathode resistor 61. Incoming signal line 23 is connected to the control grid of tube 57, while that of tube 58 is connected to a point of reference potential determined by the junction between a pair of series resistors 62 and 63. The side of resistor 62 remote from the junction is connected to the anode of tube 57 to provide cross-coupling, while that of resistor 63 is connected to ground. The anode of tube 58 is connected to ground through a pair of series resistors 64 and 65 and the common point between resistors 64 and 65 is connected to the control grid of a triode vacuum tube 66. The anode of tube 66 is connected directly to the positive anode supply source and the cathode is connected to ground through a cathode load resistor 67. The cathode of tube 66 is also connected directly to the junction between resistors 48 and 49 in the path between carrier source 11 and modulator output circuit 12.

The signal path controlling the transmission of carrier to modulator output circuit 13 is substantially the same as that controlling the transmission to modulator output circuit 12. As illustrated in Fig. 2, the slicer supplied from line 24 corresponds to phase inverter 26 in Fig. 1 and is made up of a pair of triode vacuum tubes 68 and 69. The anodes of tubes 68 and 69 are connected to the anode supply source through respective anode resistors 70 and 71, and their cathodes are connected to ground through a common cathode resistor 72. Incoming signal line 24 is connected to the control grid of tube 68, while the control grid of tube 69 is connected to the junction point between a pair of resistors 73 and 74. Resistor 73 is connected between the grid of tube 69 and the anode of tube 68, and resistor 74 is connected from the grid of tube 69 to ground. The anode of tube 69 is connected to ground through the series combination of a pair of resistors 75 and 76. The mid-point between resistors 75 and 76 is connected to the control grid of a triode vacuum tube 77. The anode of tube 77 is connected to the positive anode supply source and the cathode is returned to ground through a cathode resistor 78 and to the junction between resistors 50 and 51 in the path from carrier source 11 to modulator output circuit 13.

In accordance with a feature of the invention, the anode of slicer tube 57 and the anode of slicer tube 68 are connected through respective diodes 27 and 28 to the control grid of still another triode vacuum tube 79. The control grid of tube 79 is also returned to ground through a resistor 80 and connected to a positive source of direct potential through a resistor 29. The anode of tube 79 is connected directly to the source of direct anode potential and the cathode is connected to the junction between resistors 52 and 53 and returned to ground through a cathode load resistor 56. Diodes 27 and 28 are, as in Fig. 1, poled for easy current flow toward the respective slicer circuits.

The embodiment of the invention illustrated in Fig. 2 operates in substantially the same manner as that shown in Fig. 1. As in Fig. 1, waveforms are shown alongside certain of the leads and connections in Fig. 2 to illustrate the operation for successive D.-C. signal pulses on input leads 23 and 24. The two slicers provide simultaneous pulses of opposite sense at their two anodes. The positive-going pulses from tubes 58 and 69 are connected through respective cathode followers 66 and 77 to the modulator output circuit control paths. As shown, the D.-C. pulse applied to each control path is a positive-going pulse represented by an increase in potential from a first predetermined positive voltage level to a second predetermined higher positive voltage level. The pulses of the opposite sense from tubes 57 and 58 are connected through respective diodes 27 and 28 to the input of still a third cathode follower 79. The combined input at the control grid of tube 79 remains at the second or higher of the two predetermined levels in the absence of a signal pulse on either lead 23 or lead 24. A signal pulse on either input lead, however, causes the control grid of tube 79 to decrease in potential to the first or lower of the two predetermined levels.

When a D.-C. signal pulse is present on lead 23, the positive-going pulse from cathode follower 66 causes diodes 42 and 43 to be forward biased and to pass carrier to modulator output circuit 12. The balanced-to-ground character of the circuit balances out the D.-C. applied to the diodes for biasing and, in cooperation with transformer 44, prevents it from entering modulator output circuit 12. When diodes 42 and 43 are forward biased, the large positive potential which they pass to the high-potential side of resistor 18 keeps diodes 45, 46, 54, and 55 all strongly reverse biased. A D.-C. signal pulse on lead 24 operates in the same manner to forward bias diodes 45 and 46 and maintain diodes 42, 43, 54, and 55 in a strongly reverse biased condition.

In the absence of a signal pulse on either lead 23 or lead 24, the present invention permits diodes 42, 43, 45, and 46 to be strongly reverse biased in order to block spurious carrier transmission and also preserves substantially the same impedance match to carrier source 11 that exists in the presence of a signal pulse on one of the two input leads. In the absence of a signal pulse, the anodes of tubes 57 and 68 are in their most positive condition. This reverse biases both diodes 27 and 28 and leaves the control grid of tube 79 in its most positive condition. The cathode of tube 79 is also positive under these conditions, causing diodes 54 and 55 to be biased in the forward direction. Since the combination of resistors 52 and 53 has substantially the same resistance as both the parallel combination of resistors 48 and 49 and loaded transformer 44 and the parallel combination of resistors 50 and 51 and loaded transformer 47, carrier source 11 is presented with substantially the same terminating impedance as in the presence of a signal pulse. In addition, the large positive potential at the cathode of tube 79 is applied to the cathodes of diodes 42, 43, 45, and 46, biasing them strongly in the reverse direction and preventing spurious transmission to modulator output circuits 12 and 13.

It is to be understood that the above-described arrangements are illustrative of the application of the principles of the invention. Numerous other arrangements may be devised by those skilled in the art without departing from the spirit and scope of the invention.

What is claimed is:

1. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first diode connected between said carrier source and said modulator output circuit, a second diode connected between said carrier source and said dummy output circuit, means to bias said first diode in the forward direction and said second diode in the reverse direction in the presence of a signal pulse, permitting carrier to pass through said first diode to said modulator output circuit, and means to bias said first diode in the reverse direction and said second diode in the forward direction in the absence of a signal pulse, blocking carrier from said modulator output circuit and presenting a terminating impedance to said carrier source substantially the same as that presented thereto by said modulator output circuit.

2. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first diode connected between said carrier source and said modulator output circuit and biased in the reverse direction in the absence of a signal pulse, a second diode connected between said carrier source and said dummy output circuit and biased in the forward direction in the absence of a signal pulse, and means to bias said first diode in the forward direction and said second diode in the reverse direction in the presence of a signal pulse, permitting carrier to pass through said first diode to said modulator output circuit, carrier being blocked from said modulator output circuit and substantially the same terminating impedance as that presented by said modulator output circuit being presented to said carrier source in the absence of a signal pulse.

3. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first diode connected between said carrier source and said modulator output circuit, a second diode connected between said carrier source and said dummy output circuit, means to generate a pair of simultaneous direct current pulses, one an increase in potential from a first predetermined level to a second predetermined level and the other a decrease in potential from said second predetermined level to said first predetermined level, in response to each signal pulse, means to bias said first diode in the forward direction and said second diode in the reverse direction in the presence of one of said simultaneous pulses, permitting carrier to pass through said first diode to said modulator output circuit, and means to bias said first diode in the reverse direction and said second diode in the forward direction in the absence of the other of said simultaneous pulses, blocking carrier from said modulator output circuit and presenting a terminating impedance to said carrier source substantially the same as that presented thereto by said modulator output circuit.

4. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first diode connected between said carrier source and said modulator output circuit and biased in the reverse direction in the absence of a signal pulse, a second diode connected between said carrier source and said dummy output circuit and biased in the forward direction in the absence of a signal pulse, means to generate a pair of simultaneous direct current pulses, one an increase in potential from a first predetermined level to a second predetermined level and the other a decrease in potential from said second predetermined level to said first predetermined level, in response to each signal pulse, means to bias said first diode in the forward direction in the presence of one of said simultaneous pulses, permitting carrier to pass through said first diode to said modulator output circuit, and means to bias said second diode in the reverse direction in the presence of the other of said simultaneous pulses, carrier being blocked from said modulator output circuit and substantially the same terminating impedance as that presented by said modulator output circuit being presented to said carrier source in the absence of either of said simultaneous pulses.

5. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, means to provide a low impedance transmission path between said carrier source and said modulator output circuit and a high impedance transmission path between said carrier source and said dummy output circuit in the presence of a signal pulse, permitting carrier to flow to said modulator output circuit and blocking carrier from said dummy output circuit, and means to provide a high impedance transmission path between said carrier source and said modulator output circuit and a low impedance transmission path between said carrier source and said dummy output circuit in the absence of a signal pulse, blocking carrier from said modulator output circuit and presenting a terminating impedance to said carrier source substantially the same as that presented thereto by said modulator output circuit.

6. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first pair of diodes connected between opposite sides of said carrier source and respectively opposite sides of said modulator output circuit, a second pair of diodes connected between opposite sides of said carrier source and respectively opposite sides of said dummy output circuit, means to bias said first pair of diodes in the forward direction and said second pair of diodes in the reverse direction in the presence of a signal pulse, permitting carrier to pass through said first pair of diodes to said modulator output circuit, and means to bias said first pair of diodes in the reverse direction and said second pair of diodes in the forward direction in the absence of a signal pulse, blocking carrier from said modulator output circuit and presenting a terminating impedance to said carrier source substantially the same as that presented thereto by said modulator output circuit.

7. A circuit for modulating a carrier wave under the control of direct current signal pulses which comprises a carrier source, a source of direct current signal pulses, at least one modulator output circuit having a predetermined impedance, a dummy output circuit having substantially the same impedance as said modulator output circuit, a first pair of diodes connected between opposite sides of said carrier source and respectively opposite sides of said modulator output circuit and biased in the reverse direction in the absence of a signal pulse, a second pair of diodes connected between opposite sides of said carrier source and respectively opposite sides of said dummy output circuit and biased in the forward direction in the absence of a signal pulse, and means to bias said first pair of diodes in the forward direction and said second pair of diodes in the reverse direction in the presence of a signal pulse, permitting carrier to pass through said first pair of diodes to said modulator output circuit, carrier being blocked from said modulator output circuit and substantially the same terminating impedance as that presented by said modulator output circuit being presented to said carrier source in the absence of a signal pulse.

No references cited.